United States Patent [19]
Ahmed

[11] Patent Number: 5,633,890
[45] Date of Patent: May 27, 1997

[54] METHOD FOR INTELLIGENT DATA TERMINAL EQUIPMENT (DTE) DATA COMMUNICATION

[75] Inventor: Allam Z. Ahmed, Santa Clara, Calif.

[73] Assignees: Ricoh Company, Ltd., Tokyo, Japan; Ricoh Corporation, San Jose, Calif.

[21] Appl. No.: 201,398

[22] Filed: Feb. 24, 1994

[51] Int. Cl.$^6$ .............................. H04B 1/38; G06F 15/00
[52] U.S. Cl. ..................... 375/219; 375/220; 375/222; 395/821; 395/825
[58] Field of Search ....................... 375/219, 377, 375/299, 220, 221, 222, 369; 395/325, 821–833, 825; 358/434, 435, 436, 438, 400, 402, 442; 379/100; 370/49

[56] References Cited

U.S. PATENT DOCUMENTS

| | | | |
|---|---|---|---|
| 4,095,045 | 6/1978 | Johnson et al. | 178/2 R |
| 4,254,462 | 3/1981 | Raymond et al. | 395/325 |
| 4,549,302 | 10/1985 | Heatherington | 375/8 |
| 4,631,666 | 12/1986 | Harris et al. | 395/325 |
| 4,734,696 | 3/1988 | Rogers | 340/825.51 |
| 4,905,282 | 2/1990 | McGlynn et al. | 380/48 |
| 5,065,427 | 11/1991 | Godbole | 358/400 |
| 5,179,661 | 1/1993 | Copeland et al. | 395/250 |
| 5,319,751 | 6/1994 | Garney | 395/200 |
| 5,339,394 | 8/1994 | Johnson, Jr. et al. | 395/325 |
| 5,349,447 | 9/1994 | Kuwahara | 358/400 |
| 5,349,635 | 9/1994 | Scott | 375/222 |
| 5,416,828 | 5/1995 | Hiramatsu | 358/442 |
| 5,440,619 | 8/1995 | Cann | 379/100 |
| 5,479,485 | 12/1995 | Hayashi | 358/400 |
| 5,497,464 | 3/1996 | Yeh | 395/200.01 |

*Primary Examiner*—Edward L. Coles, Sr.
*Assistant Examiner*—Madeleine Au Nguyen
*Attorney, Agent, or Firm*—Charles E. Gotlieb; Albert C. Smith

[57] ABSTRACT

Method for two-way digital communication between Data Terminal Equipment (DTE) and Data Communication Equipment (DCE), includes a novel command set. The inventive method involves initiating communication by transmitting one command from a set of DTE commands to the command interpreter block. That block interprets the command, and acts on the command, directing the command to the appropriate control block. The control block receiving the decoded command then executes the command by sending a signal representative of the command to a hardware interface device which transmits the signal to the receiving DCE.

13 Claims, 5 Drawing Sheets

METHOD FOR INTELLIGENT DATA TERMINAL EQUIPMENT (DTE) DATA COMMUNICATION

BACKGROUND OF THE INVENTION

1. Field of the Invention

The present invention relates generally to the field of modem communication systems, and more specifically to the field of data terminal equipment (DTE) command sets.

2. Description of Related Art

During the 1970's, a small communications company called Bizcom developed the concept of adding intelligence to Data Communication Equipment (DCE) using codes, referred to as a command set, that governs the operational capability of the modem. Other modem manufacturers developed similarly performing modems. Unfortunately, during the early days of intelligent modems, the command set built into modems manufactured by different vendors typically were incompatible with each other. Thus, many communications software products originally operated only with a specific modem or a few modems, as determined by the command set for the particular modem.

The Hayes Microcomputer Products series of Smartmodems later captured over 50 percent of the personal computer modem market, and its command set became the de facto industry standard. At present, many modem manufacturers cite their products as being "Hayes compatible", which suggests that the product supports at least some of the Hayes modem command set.

The Hayes command set consists of a basic set of commands and command extensions. The basic commands, such as placing the modem off-hook (which occurs when the telephone handset is lifted from its cradle) and dialing a number are common to Hayes and Hayes-compatible modems. Command extensions, such as placing a modem into a specific operating speed or initiating certain features (including data compression or a specific type of error detection and correction) are applicable only to modems built to transmit and receive data at that speed or modems that support the requested feature.

Other modems, such as the commercially available TrailBlazer from Telebit, employ a command set that essentially is a superset of the Hayes command set. Although communications software that uses the Hayes command set operates with the TrailBlazer modem, such software cannot use the full potential of the modem since the Hayes command set does not support several TrailBlazer modem features. To effectively operate the Telebit TrailBlazer or another modem that incorporates special features, software written specifically to support those modem features is required.

The Hayes command set (referred to as the AT command set) provides intelligence only to the DCE like a modem. This command set governs its operational capability, enabling automatic dialing and redialing of telephone numbers, selection of operating transmission rate, and various other intelligent functions.

However, over the past several years, user expectations have increased and equipment including personal computers, terminals, and computer ports are used as an added source of data communications. These equipment are referred to as Data Terminal Equipment (DTE). The physical, electrical, and logical rules for the exchange of data between DTE's and DCE's are specified by an interface standard. The most commonly used interface standard are the Electronic Industries Association (EIA) RS-232-C and RS 232-D standards. These are similar to the CCITT V.24 standard used in Europe and other locations outside of North America. Both the RS-232-C and the RS-232-D formally specify the use of a D-shaped, 25-pin interface connector. The use of the RS-232-C basically has been universal since its publication by the EIA in 1969.

The RS-232 standard defines the interfacing between DTE's and DCE's in the United States. However, there is no standard command set available for the DTE offering similar operational capabilities to the DCE (intelligent) command set. The DCE typically is a separate entity and, as such, is relatively easy to define. On the contrary, the DTE could be a computer, a terminal, or another intelligent equipment. Thus, it has been difficult to clearly isolate the DTE in an intelligent equipment environment. Once the DTE functional block is abstracted out then there is a need for a system, including a standard command set, for digital communication to this DTE functional block in a DTE environment. A command set embodying the present invention will complement the present DCE standard command set.

SUMMARY OF THE INVENTION

The present invention is a system and method for digital communication to a Data Terminal Equipment (DTE), including a novel command set.

The present inventive method may be practiced with a DTE including a decoder block residing in a memory device accessible by the central processing unit (CPU) of a DTE device, having a command interpreter block, a data flow control block, a mode set up sync/async block, and a plurality of line control blocks. The decoder block is in communication with a hardware interface device, such as an RS-232 port, for transmitting executed commands, in the form of signals, to the DCE device.

The inventive method involves initiating communication by transmitting one command from a set of DTE commands to the command interpreter block. That block interprets the command, and acts on the command, directing the command to the appropriate control block of the decoder. The specific control block will depend on the command type, for example, the interpreted command may be directed either to the flow control block, the mode set-up sync/async block, or the line control block.

The control block receiving the interpreted command then executes the command by sending a signal representative of the command to a hardware interface device. The interface device functions as an interface between the DTE and the DCE, and typically consists of a standard port.

The DTE command set used in the inventive method may include the commands: track or ignore clear to send (CTS) signal; change state of data terminal ready (DTR) signal; respond to flow control schemes; track or ignore ring indicator (RI) signal; track or ignore data carrier detect (DCD) signal; set up DTE to either sync or async operation mode; change state of request to send (RTS) signal; track or ignore dataset ready (DSR) signal; set up DTE to dumb terminal mode; and reset DTE parameters. Other commands may be added to the set by the user.

DETAILED DESCRIPTION OF PREFERRED EMBODIMENTS

The present invention comprises a command set for Data Terminal Equipment (DTE) 100, providing more intelligence to the DTE. Essentially, the functionalities of the present inventive command set afford a similar functionality to a DTE 100 as available to a Data Communication Equipment (DCE) 102. However, no standards exist to handle the difference in functionalities between the two systems.

Figure 1:
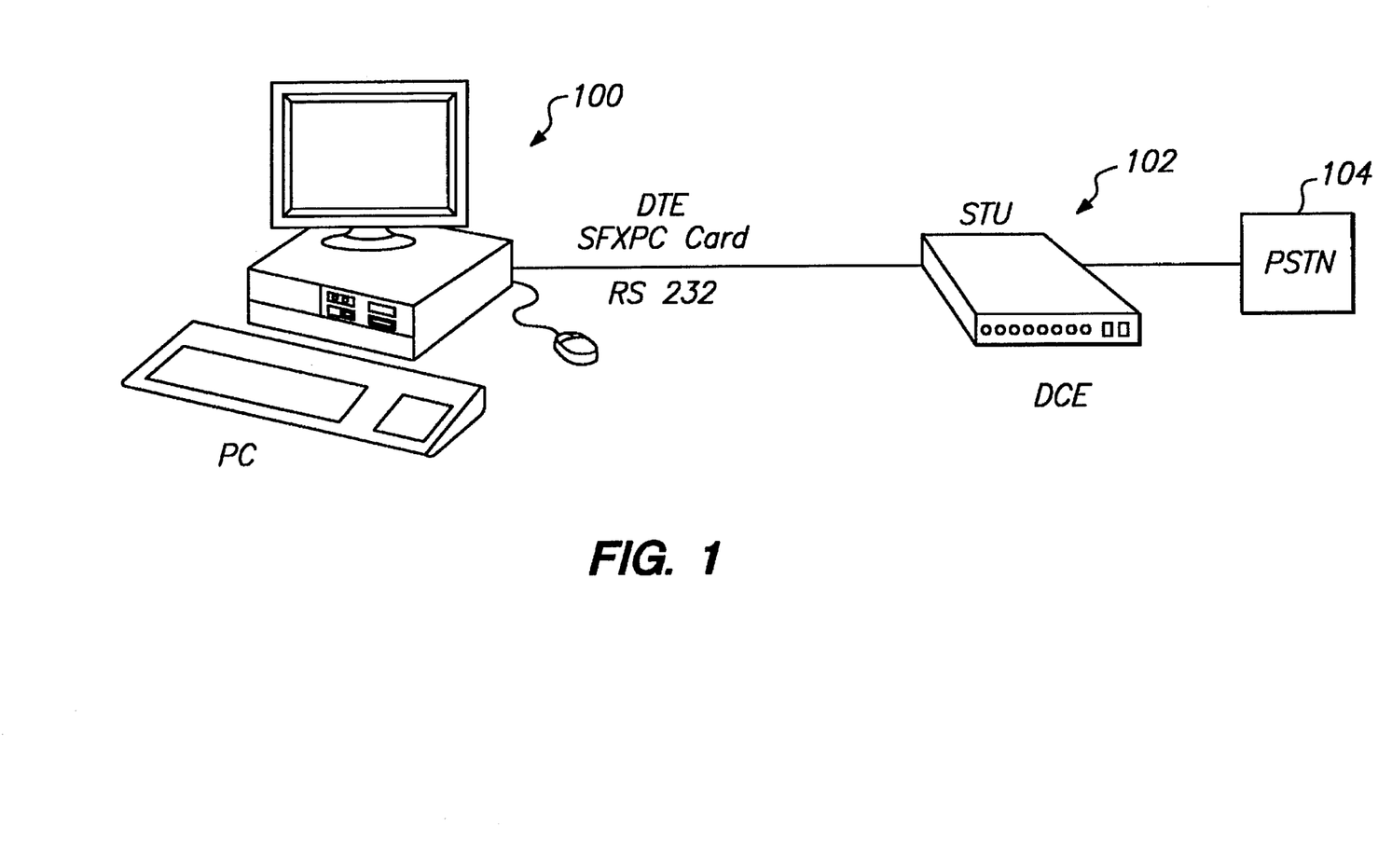
FIG. 1 depicts a hardware environment of the present invention.

As shown in FIG. 1, the DTE command set of the present invention resides on a card located in a DTE 100, such as a personal computer (PC). In a preferred embodiment, the card is a Secure Fax PC card (SFXPC card), such as commercially available from Ricoh Corporation, San Jose, Calif. The PC 100 includes an RS-232 port for transmitting data from the PC to a DCE 102, such as a secure telephone unit (STU). The DCE is in direct communication with a public switched telephone network (PSTN) 104, which typically is a two-wire facility having a structure that basically is compatible with serial transmission.

A. The Hayes Standard Command Set.

To better appreciate the present invention, it is helpful first to describe the Hayes DCE standard command set and its functionality. To facilitate the following description, the major commands of the Hayes command set are set forth in Table 1:

TABLE 1

Hayes Standard Command Set

| Command | Function |
|---|---|
| AT | Attention |
| A | Answer call |
| A/ | Repeat last command |
| B | Select the method of modem modulation |
| C | Turn modem's carrier on or off |
| D | Dial a telephone number |
| E | Enable or inhibit echo of characters to the screen |
| F | Switch between half- and full-duplex modem operation |
| H | Hang up telephone (on-hook) or pick up telephone (off-hook) |
| I | Request identification code or request check sum |
| L | Select the speaker volume |
| M | Turn speaker off or on |
| O | Place modem on line |
| P | Pulse dial |
| Q | Request modem to send or inhibit sending of result code |
| R | Change modem mode to "originate only" |
| S | Set modem register values |
| T | Touchtone dial |
| V | Send result codes as digits or words |
| X | Use basic or extended result code set |
| Y | Enable or inhibit long space disconnect |
| Z | Reset the modem |
| +++ | Escape command |

The basic format required to transmit commands to a DCE, such as a Hayes compatible intelligent modem, is:

AT Command[Parameter(s)]Command[Parameter(s)] . . . Return

Each command line includes the prefix AT, followed by the appropriate command and that command's parameters. The parameters typically are the digits 0 or 1, which define a specific command state. For example, the H0 command instructs the modem to hang up or disconnect a call; H1 instructs the modem to initiate a telephone line connection. Multiple commands may be included in one command line, with a maximum number of characters limited to the buffer size.

Figure 2:
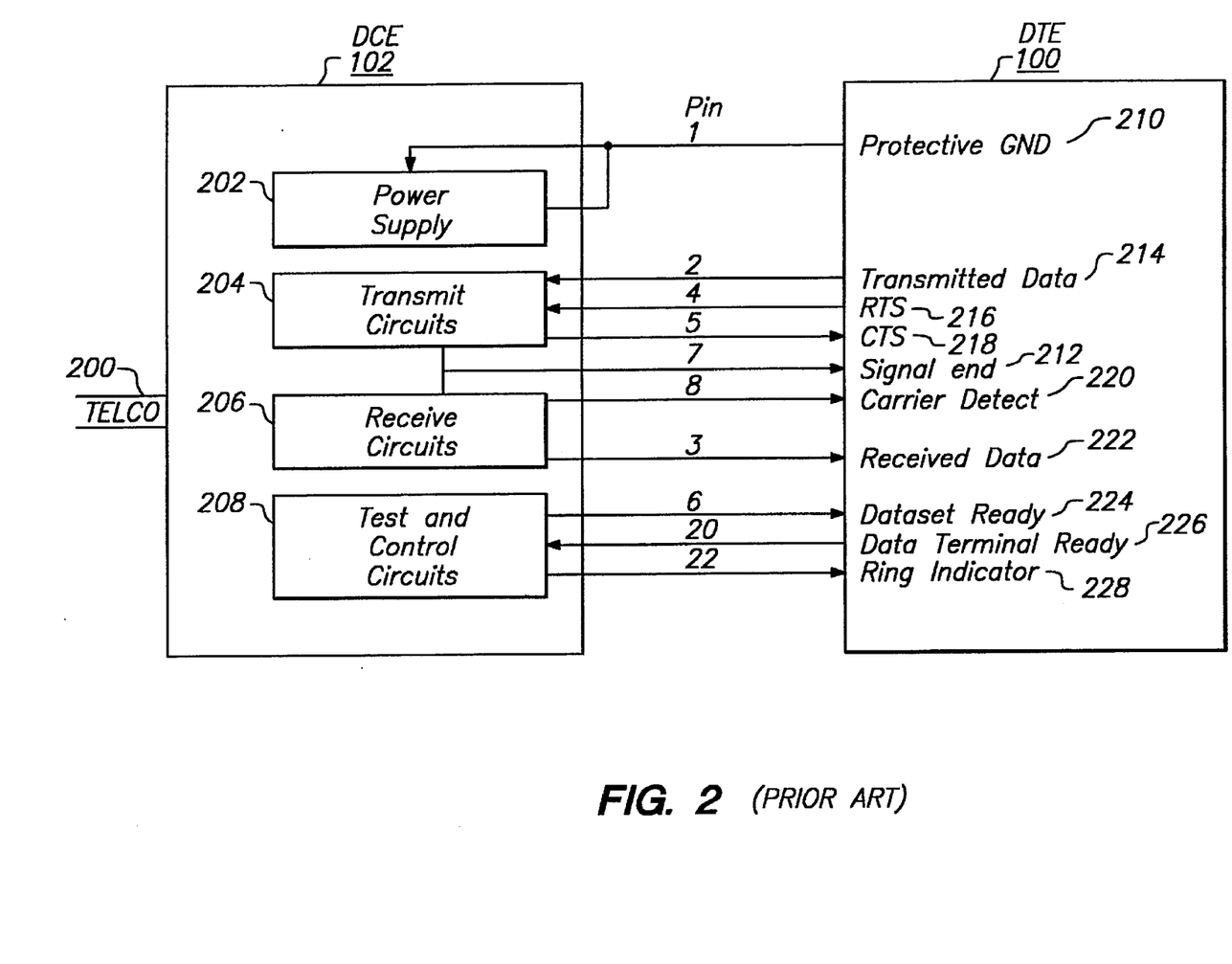
FIG. 2 depicts a typical prior art DTE to DCE interface.

Turning now to FIG. 2, that depicts the signals required to connect a typical DTE 100 (in the illustrated example, it is an IBM PS/2 or other personal computer) to a typical prior art DCE 102 (in the illustrated example, a low-speed asynchronous modem of the 212A-type). Although a 25-conductor cable may be used to cable the DTE 100 to the DCE 102, only 9 conductors actually are required in the illustrated configuration.

As illustrated, DCE 102 typically includes a power supply 202, transmit circuits 204, receive circuits 206, and test and control circuits 208, each of which are generally commercially available or may be customized to a particular manufacturer or application. As shown, typically the DTE 100 includes a protective ground (GND) 210 function at pin 1 and a signal ground (SG) 212 at pin 7. Data is transmitted 214 across pin 2. When no data is being transmitted, the DTE 100 maintains this circuit in a marking or logical 1 condition. This is the circuit 214 over which the actual serial bit stream of data flows from the DTE 100 to the DCE 102, where it is modulated for transmission.

A Request to Send (RTS) circuit 216 at pin 4 sends a signal from the DTE 100 to the DCE 102 to prepare the DCE 102 for transmission. Prior to actually sending data, the DTE 100 must receive a Clear to Send (CTS) signal across the CTS circuit 218 from the DCE 102 on pin 5. The CTS interchange circuit 218 sends a signal to the DTE 100 indicating that the DCE 102 is ready for data. By turning this circuit 218 OFF, the DCE 102 informs the DTE 100 that it is not ready for data. The DCE 102 raises the CTS signal after the DTE 100 initiates an RTS signal.

The Carrier Detect (CD) circuit 220 at pin 8, also referred to as the Received Line Signal Detector (RLSD), receives a signal from the DCE 102 indicating to the DTE 100 that the DCE 102 is receiving a carrier signal from a remote modem. This implies that the remote end is on-line. Presence of the carrier implies that Received Data at pin 3 on the DCE 102 is valid data being received from the remote DCE.

After the DCE 102 demodulates data, it is transferred to the attached DTE 100 over the Received Data (RD) circuit 222 at pin 3. When the DCE 102 is not sending data to the DTE 100, this circuit 222 is held in the marking condition. Signals on the Dataset Ready (DSR) circuit 224 at pin 6 indicate the status of the dataset connected to the DTE 100. When this circuit 224 is in the ON condition, it serves as a signal to the terminal that the DCE 102 is connected to a telephone line 200 and is ready to transmit data. Because the RS-232 standard specifies that the DSR signal is ON when the DCE 102 is connected to the communications channel and not in any test condition, a DCE 102 using a self-testing feature or automatic dialing capability would pass this signal to the DTE 100 after the self-test is completed or after the telephone number of a remote location is successfully dialed.

The Data Terminal Ready (DTR) circuit 226 at pin 20 controls the DCE's 102 connection to the telephone line 200. An ON condition on this circuit 226 prepares the DCE 102 to be connected to the telephone line 200, after which the connection may be established by manual or automatic dialing. If the signal on this circuit 226 is placed in an OFF condition, it causes the DCE's 102 that recognize the absence of this control signal to drop any present telephone connection, providing a mechanism for the DTE 100 to control the line connection.

The Ring Indicator (RI) interchange circuit 228 at pin 22 indicates to the DTE 100 that a ringing signal is being received on the communications channel. This circuit 228 is used by an auto answer modem to "wake up" the attached DTE 100. In a preferred embodiment, a telephone rings for one second and then pauses for four seconds, so this line 228 becomes active for one second every five seconds when an incoming call occurs. In an embodiment, a DCE 102 connected to the PSTN 104 that has an automatic answer feature is designed to recognize the ringing voltage on the telephone line. The DCE 102 passes the ringing indicator to the attached DTE 100 by asserting a voltage on pin 22 in cadence with the line's ringing signal. Thus, the RI circuit 228 at pin 22 serves as a "wake-up" signal to the DTE 100. In response to the RI signal, the DTE 100 asserts a voltage across DTR circuit 226 at pin 20 which, in effect, tells the DCE 102 to go off-hook and answer the call.

Figure 3:
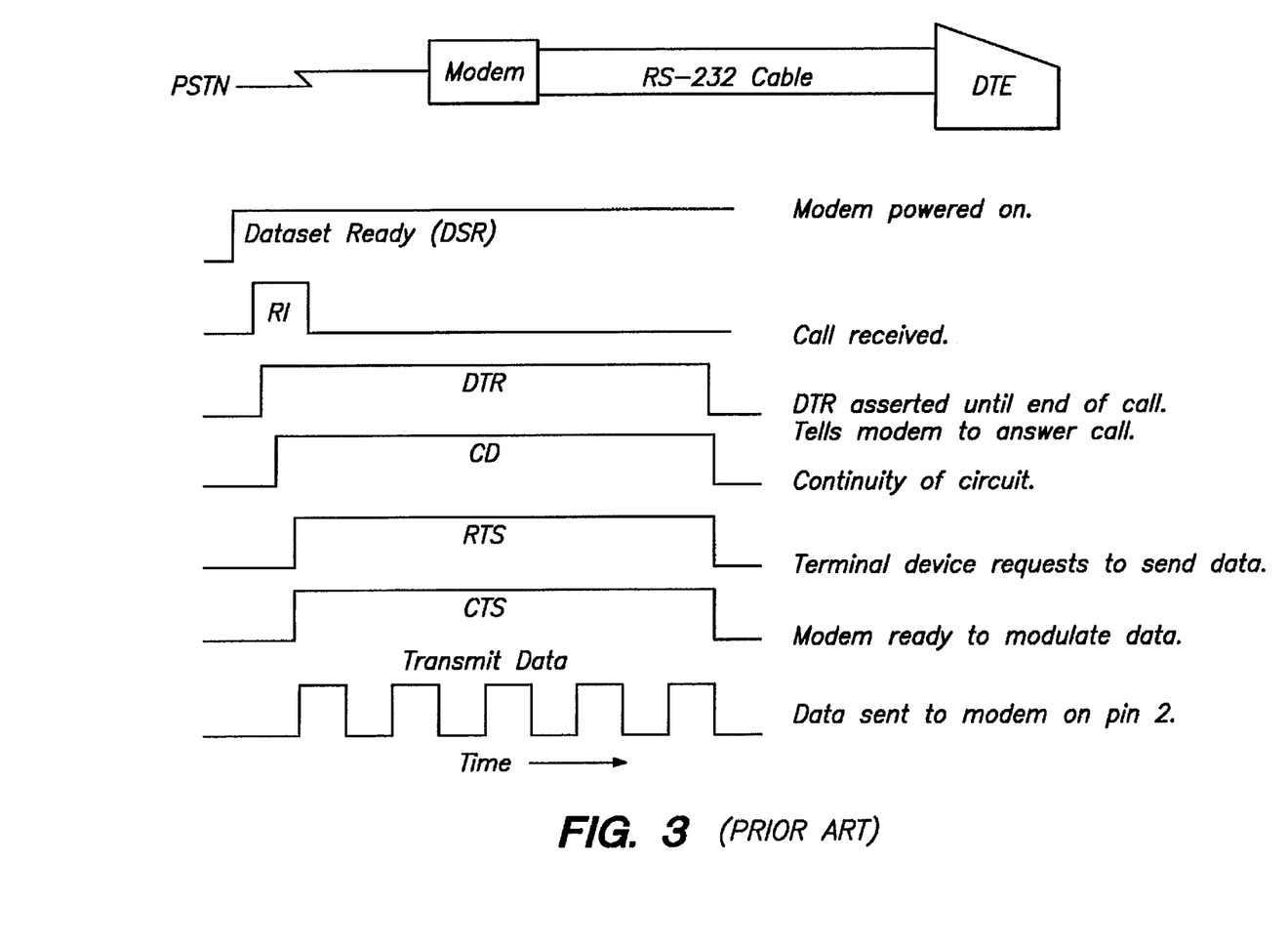
FIG. 3 depicts a typical prior art sequence of control signals in a DTE to DCE interface.

FIG. 3 illustrates an exemplary exchange of control signals between a standard DTE 100 and a DCE 102 of the prior art. When the DCE 102 is powered on, the DCE 102 passes a DSR signal to the DTE 100. An incoming call causes the DCE 102 to respond to the ringing voltage by toggling pin 22 (Ring Indicator) in tandem with the ringing signal on the line. Some DTEs 100 will assert DTR high as soon as they are powered-on; others raise the DTR control signal in response to a ring indicator signal, as illustrated in FIG. 3.

The originating DCE (not shown) transmits a carrier tone to the answering DCE 102. The receipt of this tone by the answering DCE 102 indicates both (a) the continuity of a circuit established by one DCE 102 dialing another via the PSTN 104 and (b) the fact that a modem is at the other end of the circuit. If the DTE 100 is a computer, the assertion of a Ring Indicator signal followed by a Carder Detect signal indicates an incoming data call versus the possibility of a wrong number being dialed.

Normally, the DTE 100 transmits some type of "welcome" message to the DCE 102 that is attempting to access the DTE 100. To transmit data, the DTE 100 raises its Request to Send (RTS) signal, which must be acknowledged by the DCE 102 responding by raising its Clear to Send (CTS) control. At this time, the DTE 100 port transmits data to the DCE 102 on pin 2 and may receive data on pin 3.

B. DTE Command Set

The present invention involves the use of a novel, standard command set to further enable communication to a DTE 100 functional block. In the system of the present invention, the SFX PC card includes other broader functions along with the functions of the DTE 100. Communication to the DTE 100 functional block is achieved by a command set.

A list of exemplary commands are set forth in Table 2 below. These commands are originated at the DTE 100 executed by the DTE itself, as compared with the commands presented above in Table 1, which are originated at the DTE 100, but executed by the DCE 102.

TABLE 2

| Command | DTE Command Set Function |
|---|---|
| C | Either track or ignore the CTS signal |
| D | Change the state of the DTR signal |

TABLE 2-continued

| Command | DTE Command Set Function |
|---|---|
| F | Respond to the Flow control schemes |
| I | Either track or ignore the RI signal |
| K | Either track or ignore the Data Carrier detect signal |
| P | Sets up the DTE device to either Async or Sync operation mode |
| R | Change the state of the RTS signal |
| S | Either track or ignore the DSR signal |
| T | Sets up the DTE to a dumb terminal mode |
| Z | Resets the DTE parameters to their default or initial values |

These commands are initiated by an initiation code, such as RI (for RICOH). The basic format required to transmit the commands to an intelligent DTE 100 is:

RI Command[Parameter(s)]Command[Parameter(s)] ... Return

Thus, each command line includes the initiation code, RI, followed by the appropriate command and the command parameters. The command parameters are digits or a combination of digits and letters.

The C command, which represents a Clear To Send (CTS) signal track command, is formatted RICn, wherein n=0 or 1. This command directs the DTE 100 to either track or ignore the Clear To Send (CTS) signal. For example, RIC0 directs the DTE 100 to ignore the CTS signal; and RIC1 directs the DTE 100 to track the CTS signal, i.e., does not transmit data unless CTS is present.

The D command, which represents a Data Terminal Ready (DTR) signal control command, is formatted RIDn, wherein n=0, 1, or 2. The D command directs the DTE 100 to change the state of the DTR signal. For example, RID0 directs the DTE to drop DTR; RID1 directs the DTE to raise DTR; and RID2 directs the DTE to toggle DTR.

The F command, which represents a Flow Control Response (FCR) command, is formatted RIFn, wherein n=0, 1, 2, or 3. The F command directs the DTE to respond to the Flow control schemes. For example, RIF0 directs the DTE to respond to Flow Control; RIF1 directs the DTE not to respond to Xon/Xoff character pair (in-band signaling or software control); RIF2 directs the DTE to respond to RTS/CTS signal (out-band signaling or hardware control); and RIF3 directs the DTE to respond to both in-band and out-band signaling.

The I command, which represents a Ring Indicator (RI) signal track command, is formatted RIIn, wherein n=0 or 1. The I command directs the DTE 100 to either track or ignore the Ring Indicator signal. For example, RII0 directs the DTE to ignore the RI signal; and RII1 directs the DTE to track the RI signal.

The K command, which represents a Data Carrier Detect (DCD) signal track command, is formatted RIKn, wherein n =0 or 1. The K command directs the DTE to either track or ignore the DCD signal. For example, RIK0 directs the DTE to ignore the DCD signal; and RIK1 directs the DTE to track the DCD signal, i.e., not transmit data unless DCD is present.

The P command, which represents a Protocol Setup (PS) command, is formatted RIPXn, wherein X=A (Asynchronous) or S (Synchronous), and n=any non-zero whole number. The P command sets up the DTE device to either asynchronous or synchronous mode of operation. For example, RIPA3 sets up the DTE to asynchronous mode 3, which may be 9600 baud, 1 stop bit, no parity, or any predefined parameter.

The R command, which represents a Request to Send (RTS) signal control, is formatted RIRn, wherein n=0, 1, or 2. The R command directs the DTE to change the state of the RTS signal. For example, RIR0 directs the DTE to drop the RTS; RIR1 directs the DTE to raise the RTS; and RIR2 directs the DTE to toggle the RTS.

The S command, which represents a Data Set Ready (DSR) signal track command, is formatted RISn, wherein n=0 or 1. The S command directs the DTE to either track or ignore the DSR signal. For example, RIS0 directs the DTE to ignore the DSR signal; and RIS1 directs the DTE to track the DSR signal, i.e., not transmit data unless a DSR is present.

The T command sets up the DTE to a dumb terminal mode, and is formatted RITn, wherein n=0 or 1. For example, RIT0 sets terminal mode OFF; and RIT 1 sets terminal mode ON. The Z command resets the DTE parameters to their default or initial values and has no associated parameter value. Thus, for example, RIZ resets the DTE.

The command set may be expanded to add more capabilities to the DTE 100 in addition to those shown in the above examples. At present, none of the commands described above are available in a DTE 100, although some of these commands may be available for DCEs 102. Thus, the present invention adds previously unavailable functionality to the DTEs 100 without altering the interaction between a DTE 100 modified in accordance with the present invention and commercially available DCEs 102. In addition, the command set described above may be originated by the DTE 100 using a standard interface language, such as C, or directly entered by a user via a keyboard attached to a PC or other computer device.

Figure 4:
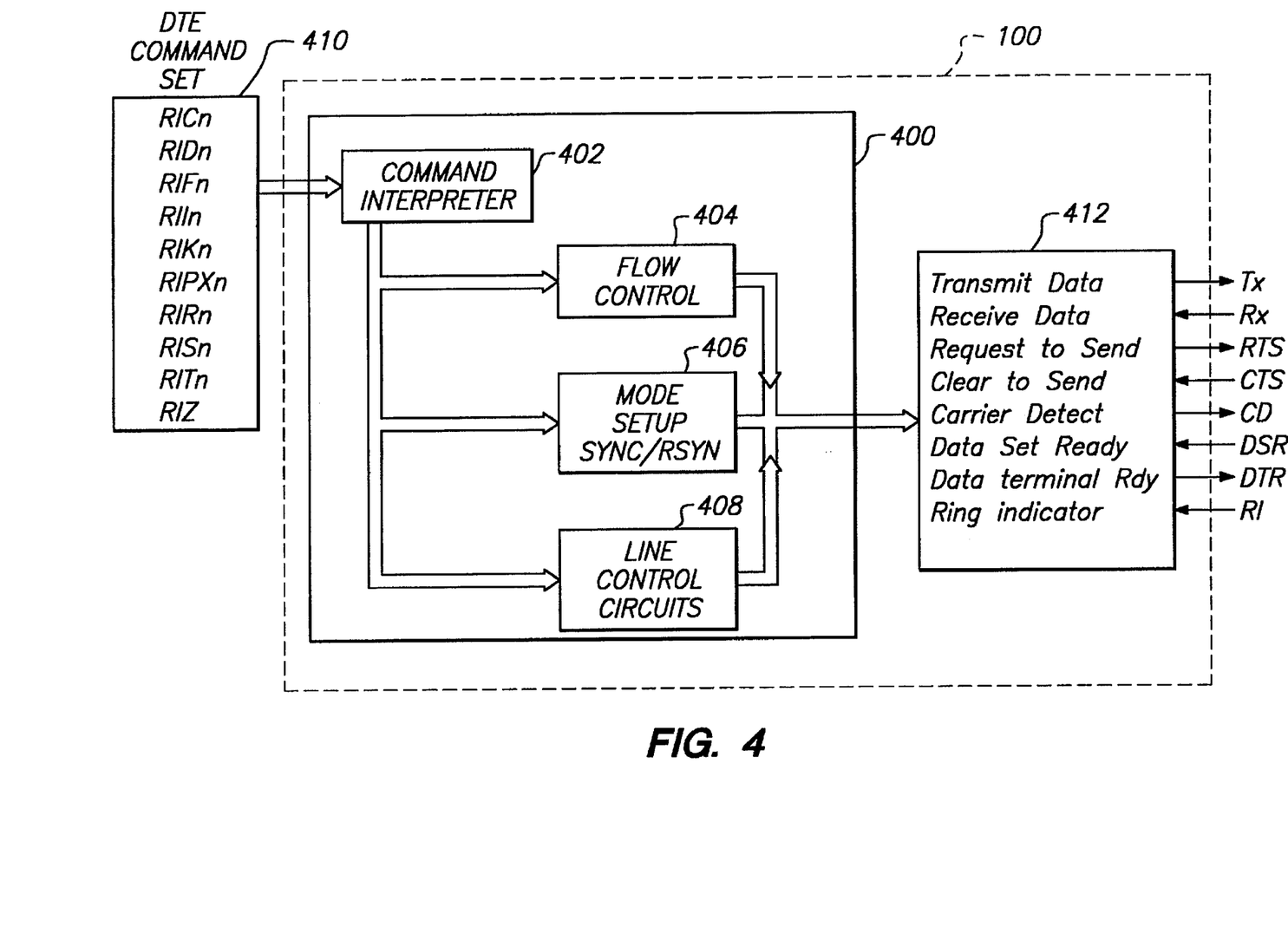
FIG. 4 depicts an exemplary sequence of control signals in a DTE interface embodying the present invention.

FIG. 4 depicts an exemplary DTE 100 including an embodiment of the present invention. As shown, the DTE 100 of the present invention includes a command interpreter 402 and one or more command controls, labeled as the flow control block 404, the mode setup sync/async block 406 and the line control block 408 in FIG. 4. These blocks of code reside in a memory device 400 of the SFX PC card of the DTE 100. The command interpreter 402 includes a command set 410 which may be invoked by a user to initiate and act upon by the interpreter 402.

Figure 5:
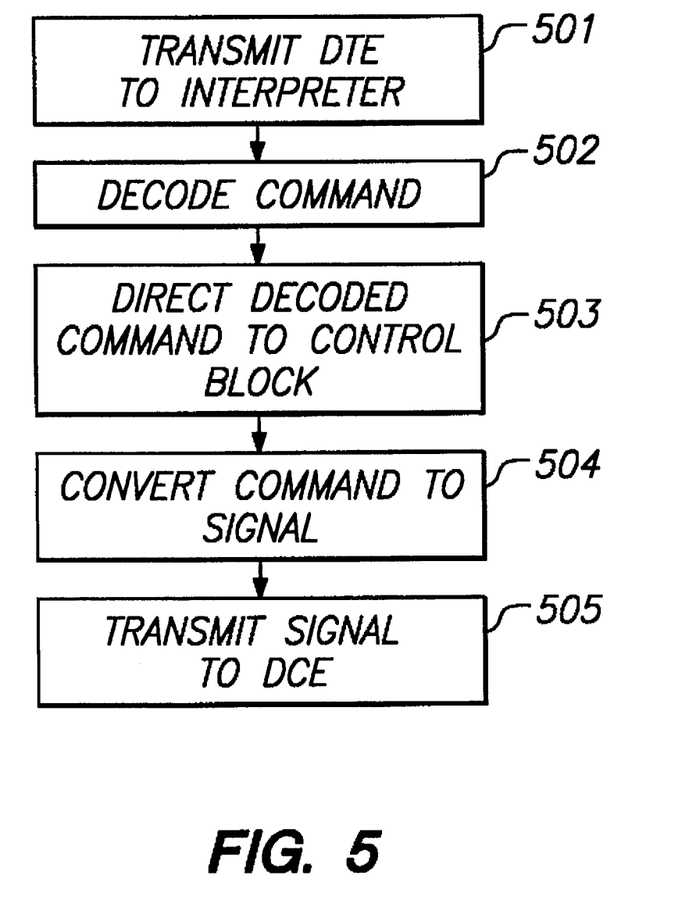
FIG. 5 is a flow diagram of an embodiment of the present inventive method.

One command from the DTE command set 410 is transmitted to the DTE device, typically by an end-user entering data via the keyboard for the PC or from some other source external to the DTE 100. As shown in FIG. 5, the selected command is transmitted 501 to the command interpreter 404, which decodes 502 the command and acts on it by directing 503 it to one of the control blocks (e.g., 404, 406, or 408). For example, an RIFn command may be directed to the flow control block 404, an RIPXn command may be directed to the mode setup sync/async block 406, or any of the other commands may be directed to the line control block 408.

The selected control block then executes the command, converting 504 the command into a signal representative of the command. For example, if the command is RIR, the line control block 408 will generate a signal that represents "drop the RTS line". This signal generated by the control block is transmitted 505 to the DCE 102 device. In a preferred embodiment, the signal is sent from the control block to a hardware interface device 412, such a universal synchronous/asynchronous receiver/transmitter (USART). In a preferred embodiment, the hardware interface 412 is an RS-232 port. The interface device 412 transmits the signal to the receiving DCE 102. The two devices 100, 102 then begin standard processing of the data to be transmitted/received in accordance with standard modem protocol, and as described above in relation to FIG. 2. Specifically referring to FIG. 2, the signals of pins 4, 5, 6, and 20 commonly are referred to as handshaking signals. These signals govern the sequence of actions that must occur for DCEs 102 to accept data from DTEs 100 for modulation.

The present invention thus offers the following advantages: a DTE 100 with enhanced functionality that is compatible with existing DCEs 102; and a DTE 100 providing essentially unlimited future expansion by the addition of commands to a command set. From the above, other embodiments of and modifications to the present invention will suggest themselves to those skilled in the art. Therefore, the scope of the present invention is to be limited only by the claims presented below.

What is claimed is:

1. In a data terminal equipment (DTE) device including, in intercommunication, a command interpreter block and a plurality of control blocks in communication with a digital communication equipment (DCE) device, a method of digital communication between the devices, comprising the steps of:

A. initiating the digital communication by transmitting within the DTE one command from a DTE command set to the command interpreter block, the DTE command set having no field reserved for data that is to be transmitted to another DTE;

B. decoding the command;

C. directing the decoded command from the command interpreter to one of the control blocks;

D. converting the decoded command into a signal representative of the decoded command; and E. transmitting the signal from the control block to the DCE.

2. The method of claim 1, wherein the DTE command set includes one command from the group consisting of: track or ignore clear to send (CTS) signal; respond to flow control schemes; track or ignore ring indicator (RI) signal; track or ignore carrier detect (DCD) signal; set up DTE to either sync or async operation mode; track or ignore dataset ready (DSR) signal; set up DTE to dumb terminal mode; and reset DTE parameters.

3. The method of claim 1, wherein the DTE further comprises a hardware interface device, the method further comprising, after the step of converting the decoded command, transmitting the signal from the control block to the hardware interface device.

4. The method of claim 2, wherein the command interpreter and the control blocks reside in a single memory device within the DTE and the control blocks include one from the group of blocks consisting of: data flow control; mode set-up sync/async; and line control.

5. The method of claim 1, wherein the DTE command set includes one command from the group consisting of: (i) track or ignore clear-to-send (CTS) signal, (ii) track or ignore ring indicator (RI) signal, (iii) track or ignore data carrier detect (DCD) signal, and (iv) track or ignore dataset ready (DSR) signal.

6. The method of claim 5, wherein the DTE command set further includes one command from the group consisting of: (i) respond to flow control schemes, (ii) set up DTE to either synchronous or asynchronous operation mode; (iii) set up DTE to dumb terminal mode, and (iv) reset DTE parameters.

7. The method of claim 6, wherein the DTE command set further includes one command from the group consisting of:

(i) change state of data terminal ready (DTR) signal, and (ii) change state of request-to-send (RTS) signal.

8. In a data terminal equipment (DTE) device including, in intercommunication, a command interpreter block and a plurality of control blocks within a single memory device, and a hardware interface device in communication with a digital communication equipment (DCE) device, a method comprising the steps of:

A. transmitting within the DTE one command from a DTE command set to the command interpreter block, the DTE command set having no field reserved for data that is to be transmitted to another DTE;

B. decoding the command in the command interpreter block;

C. directing the decoded command from the command interpreter to one of the control blocks, the plurality of control blocks comprising:
    a data flow control block,
    a mode set-up sync/async block, and
    a line control block;

D. converting the decoded command in the control block into a signal representative of the decoded command; and     E. transmitting the signal from the control block to the hardware interface device.

9. The method of claim 8, wherein the DTE command set comprises (i) track or ignore clear-to-send (CTS) signal, (ii) track or ignore ring indicator (RI) signal, (iii) track or ignore data carrier detect (DCD) signal, and (iv) track or ignore dataset ready (DSR) signal.

10. The method of claim 8, wherein the DTE command set comprises (i) respond to flow control schemes, (ii) set up DTE to either synchronous or asynchronous operation mode; (iii) set up DTE to dumb terminal mode, and (iv) reset DTE parameters.

11. The method of claim 8, wherein the DTE command set comprises (i) change state of data terminal ready (DTR) signal, and (ii) change state of request-to-send (RTS) signal.

12. The method of claim 9, wherein the DTE command set further comprises (i) respond to flow control schemes, (ii) set up DTE to either synchronous or asynchronous operation mode; (iii) set up DTE to dumb terminal mode, and (iv) reset DTE parameters.

13. The method of claim 12, wherein the DTE command set further comprises (i) change state of data terminal ready (DTR) signal, and (ii) change state of request-to-send (RTS) signal.

* * * * *